(12) United States Patent
Visseaux et al.

(10) Patent No.: US 9,001,616 B2
(45) Date of Patent: Apr. 7, 2015

(54) METHOD FOR SIMULATING THE POSITIONING OF AT LEAST ONE STREAMER COMPRISING A STEP FOR PREDICTING THE CURRENT ON AT LEAST TWO DISTINCT POINTS OF THE STREAMER

(75) Inventors: Clement Visseaux, Carquefou (FR); Veronique L'Her, Plougastel (FR)

(73) Assignee: Sercel, Carquefou (FR)

( * ) Notice: Subject to any disclaimer, the term of this patent is extended or adjusted under 35 U.S.C. 154(b) by 1493 days.

(21) Appl. No.: 12/245,881

(22) Filed: Oct. 6, 2008

(65) Prior Publication Data

US 2009/0097355 A1 Apr. 16, 2009

(30) Foreign Application Priority Data

Oct. 10, 2007 (FR) ...................................... 07 07093

(51) Int. Cl.
*G01V 1/38* (2006.01)

(52) U.S. Cl.
CPC ............ *G01V 1/3835* (2013.01); *G01V 1/3817* (2013.01)

(58) Field of Classification Search
CPC ........................... G01V 1/3817; G01V 1/3835
USPC ....................................................... 367/15–25
See application file for complete search history.

(56) References Cited

U.S. PATENT DOCUMENTS

| | | | |
|---|---|---|---|
| 6,618,321 B2 * | 9/2003 | Brunet | 367/19 |
| 2006/0256653 A1 * | 11/2006 | Toennessen et al. | 367/16 |
| 2009/0141587 A1 * | 6/2009 | Welker et al. | 367/16 |

FOREIGN PATENT DOCUMENTS

| | | |
|---|---|---|
| FR | 2 807 842 | 4/2000 |
| GB | 2 432 911 | 6/2007 |
| WO | WO 2007/006785 | 1/2007 |

OTHER PUBLICATIONS

French Search Report, dated Jun. 26, 2008, 2 pages.

* cited by examiner

*Primary Examiner* — Krystine Breier
(74) *Attorney, Agent, or Firm* — David D. Brush; Westman, Champlin & Koehler, P.A.

(57) ABSTRACT

A method for simulating the positioning of at least one acoustic linear antenna towed in a study zone is provided. The method includes at least one simulation step of at least one future position of at least one point of the acoustic linear antenna(e), at least one step for predicting the temporal and spatial variations of at least one marine current likely to interact with the acoustic linear antenna(e) and at least one step for determining the form of the acoustic linear antenna(e) by the resolution of a hydrodynamic model. The prediction step(s) include an upstream phase for determining a current at at least two determined points of the zone; a simulation phase of at least one future position of the determined points; a temporal projection phase of the current determined during the upstream phase at each future position; and a spatial projection phase of the currents at at least two distinct points of the acoustic linear antenna(e) occupying future position(s) of the simulation step.

11 Claims, 5 Drawing Sheets

METHOD FOR SIMULATING THE POSITIONING OF AT LEAST ONE STREAMER COMPRISING A STEP FOR PREDICTING THE CURRENT ON AT LEAST TWO DISTINCT POINTS OF THE STREAMER

CROSS-REFERENCE TO RELATED APPLICATIONS

This application claims the benefit of French Patent Application No. FR 07/07093 filed on Oct. 10, 2007, which application is hereby incorporated by reference in its entirety.

BACKGROUND OF THE INVENTION

1. Field of the Invention

The field of the invention is that of geophysical data acquisition. More precisely, the invention relates to equipment for analysing sea-beds.

In particular, the invention relates to the oil exploration industry using the seismic method, but may be applied to any field using a geophysical data acquisition network in a marine environment.

2. Background of the Invention

The geophysical data acquisition operations usually use sensor networks (called "hydrophones" for seismic data acquisition in marine environments). To collect the geophysical data in the marine environment, one or several immersed seismic sources are activated to sweep omnidirectional seismic wave trains. The wave trains generated are captured by the hydrophones previously mentioned, the latter being positioned along the length of the cables to form acoustic linear antennae that are commonly called "streamers". Usually, the geophysical data in the marine environment is acquired using a series of streamers towed by one or more ships.

In practice, the aim is to analyse a sea bed with a minimum number of passes of the ship in the zone concerned. For this purpose, the width of the sensor network is increased as far as possible, which implies using a large number of streamers. The problem of the streamers location is therefore particularly sensitive given that their length varies between 6 and 15 kilometers. Indeed, the streamers are subjected to different external forces of variable nature and strength, such as marine currents, wind, waves, . . . .

These external constraints cause geometrical deformations of the streamers that need to be anticipated so as to navigate with greater safety and to ensure satisfactory coverage of the study zone for which the sea-bed is to be characterised. On one hand, when obstacles such as an oil rig are to be avoided, the network of streamers may have transversal drift and consequently there is a risk of collision is harmful for the safety. On the other hand, the network of streamers may have a different form from one line to another of the ship in the study zone, and these deformations are variable in time and can thus cause "holes in the coverage" that need to be filled by extra passes of the ship. These passes cause increased costs of the acquisition operations.

It can therefore be understood that there are obvious requirements for the improvement of the safety and of the reduction of the costs. However, to satisfy these requirements, the influence of the current on the deformations of the streamers needs to be characterised.

A method for simulating the positioning of a streamer and for aiding to the navigation is proposed in the prior art, described in the patent document published under the number FR-2 807 842. The purpose of this technique is to model the form of the streamers by firstly determining the current that is likely to interact with the streamers. According to the technique described, the method for simulating the positioning of a streamer comprises a phase for determining the temporal and spatial variations of the current. After this phase, the method permits current "objects" to be obtained, used to calculate the form of a streamer.

SUMMARY OF THE INVENTION

The invention provides a method for simulating the positioning of at least one acoustic linear antenna towed in a study zone, comprising at least one simulation step of at least one future position of at least one point of said acoustic linear antenna(e), at least one step for predicting the temporal and spatial variations of at least one marine current likely to interact with said acoustic linear antenna(e) and at least one step for determining the form of said acoustic linear antenna (e) by the resolution of a hydrodynamic model, characterised in that said prediction step(s) comprise:

an upstream phase for determining a current for at least two determined points of said zone;

a simulation phase for at least one future position of said determined points;

a temporal projection phase for said current determined during said upstream phase for each future position;

a spatial projection phase for said currents at at least two distinct points of said acoustic linear antenna(e) occupying said future position(s) of the simulation step.

Consequently, an improved spatio-temporal prediction of the current is obtained on the streamers, in particular by:

taking into account the future positions of said points to which the upstream phase has been applied;

taking into account the future positions of the head of the streamers;

taking into account the variations of the current along the length of the streamers.

As the reliability of the current prediction is improved, consequently improved prediction of the form of the streamers is obtained for a future trajectory of the ship.

DETAILED DESCRIPTION

Figure 1:
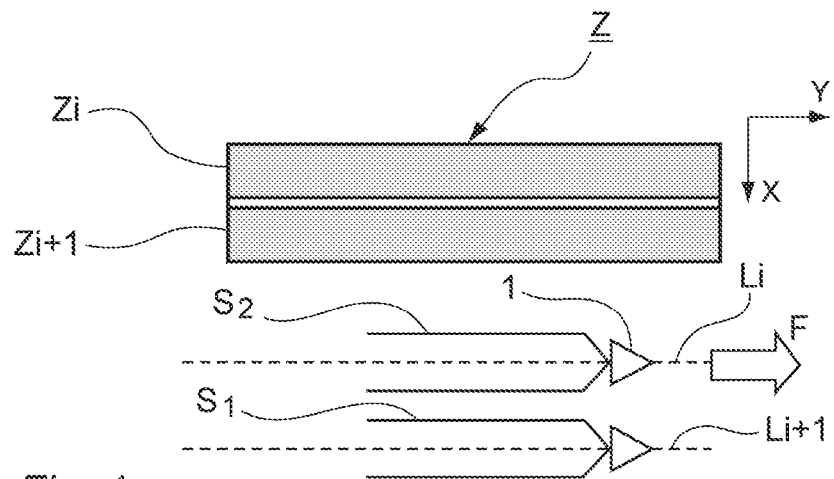
FIGS. 1 to 3 are diagrammatical representations of a ship towing operating streamers, and zones of coverage generated by the passage of the ship.

As previously mentioned, streamers can measure over 10 kilometers in length, such that the current at the head and the current at the tail of the streamers may be substantially different (this is especially the case in navigational zones that are not dominated by tidal currents, such as for example in the Gulf of Mexico). The variations in current over the length of the streamers influence their form, and failing to take this into account when carrying out a simulation of the shape of the streamer would lead to results that could be far removed from the actual situation.

In the technique for determining currents described by the patent document published under the number FR-2 807 842, the method described does not take into account the spatial variations of the current along the length of the streamers. Furthermore, the method provides several predictions (in total, four current "objects") and no objective mean that permits the best prediction to be chosen is proposed.

The purpose of the invention in particular is to overcome the disadvantages of the prior art. More precisely, the purpose of the invention is to propose a method for simulating the positioning of at least one streamer towed in a study zone, including one or several current predictions, which take into account the current variations in time and in space along the length of the streamer. Another purpose of the invention is to provide a method which permits the quality of the current predictions to be improved. Another purpose of the invention is to provide a method which permits the navigator to have several predictions, and to help him to choose which prediction should be applied. Another purpose of the invention is to provide a method which permits the safety of the geophysical data acquisition operations to be improved. Another purpose of the invention is to provide a method which permits the "holes in the coverage" to be reduced in order to limit the number of extra passes of the ship, in a more optimised manner than compared with the technique of the prior art.

These purposes are achieved by the present invention whose subject matter is a method for simulating the positioning of at least one acoustic linear antenna towed in a study zone, comprising at least one simulation step of at least one future position of at least one point of said acoustic linear antenna(e), at least one step for predicting the temporal and spatial variations of at least one marine current likely to interact with said acoustic linear antenna(e) and at least one step for determining the form of said acoustic linear antenna(e) by the resolution of a hydrodynamic model, characterised in that said prediction step(s) comprise:

an upstream phase for determining a current for at least two determined points of said zone;
a simulation phase for at least one future position of said determined points;
a temporal projection phase for said current determined during said upstream phase for each future position;
a spatial projection phase for said currents at at least two distinct points of said acoustic linear antenna(e) occupying said future position(s) of the simulation step.

Consequently, an improved spatio-temporal prediction of the current is obtained on the streamers, in particular by:
taking into account the future positions of said points to which the upstream phase has been applied;
taking into account the future positions of the head of the streamers;
taking into account the variations of the current along the length of the streamers.

As the reliability of the current prediction is improved, consequently improved prediction of the form of the streamers is obtained for a future trajectory of the ship As will be explained in more details below, the upstream phase is especially carried out by successive measurements of said current in a discreet number of at least one determined point of said study zone. It may be understood that the measurements made may be mobile within the study zone.

In this way, firstly the future current is determined at certain points of the study zone. For this, past measurements of the current are available, associated positions and possibly oceanographic predictions from external bodies ("the predictive data from pre-established bulletins"). Future positions associated to the measurements obtained during the simulation phase are also available.

From the in-situ measurements, it is possible to predict the current in the near future. By combining the in-situ measurements with the predictions, it is also possible to make another prediction in the near future.

As will become clearer below, a digital comparison of the predictions and the currents measured in the past permits the best type of predictions in the coming hours to be determined, or to define a new prediction that is simply the judicious weighting of the different predictions proposed.

When the future current has been determined in several points, it is then possible to define the future current along the length of the streamers.

Finally, based on this and on the hydrodynamic parameters of the streamers and the tail buoys, and the future positions of the ship (and the future positions of points along the length of the streamers), the future form of the streamers is determined by digital resolution of a hydrodynamic model.

In the end, from the future positioning of the streamers, the drift map of a point of the streamer in the future is determined, which makes it possible to navigate more safely.

According to two approaches that may be envisaged, said temporal projection phase precedes said spatial projection phase, or, alternatively, said spatial projection phase precedes said temporal projection phase.

According to different embodiments that may be envisaged, said successive measurements are carried out:
at at least two points of a trajectory of said acoustic linear antenna(e), at least one point in front of said linear antenna(e) and at least one point behind said linear antenna(e) with respect to said trajectory, said spatial projection phase comprising at least one interpolation step in one dimension of said measurements along said acoustic linear antenna(e);
at at least three points which together define a space in which at least one acoustic linear antenna is contained, said spatial projection phase comprising at least one interpolation step in two dimensions of said measurements along said acoustic linear antenna(e).

According to yet another embodiment that may be envisaged, said successive measurements are carried out at a single moving point, said measurements at said moving point being projected to at least one second point of said zone.

It may be noted that this embodiment has the advantage of only requiring one means of current measurement (a current meter), installed on the ship for example.

In this case, according to a first variant that may be envisaged, the method preferably comprises either a temporal offset step with respect to a relative reference such as a reference associated to the current meter or a spatial offset step with respect to an absolute reference of said measurements at said moving point.

According to a second variant, the method comprises a selection step, for said projection at said second point, between said spatial offset step and said temporal offset step, by comparing the reference forms, corresponding to actual forms that said acoustic linear antenna(e) have had, with simulated forms obtained by applying said spatial offset step and said temporal offset step.

According to another feature of the invention, said temporal projection phase uses at least one temporal projection technique of said measurements and at least one spatio-temporal interpolation technique of predictive data based on pre-established bulletins.

In this case, said temporal projection phase uses at least one combination technique of said temporal projection phase and of said spatio-temporal interpolation technique, said combination technique preferably comprising a step for determining the differences by comparing of the results of said spatio-temporal interpolation step in the past with currents measured in said upstream phase, said differences being intended to be projected in the time and to be added to the results of said spatio-temporal interpolation step for the future.

According to another feature of the invention, said temporal projection phase comprises a step for choosing a technique or a combination of at least one technique from the group of:
said temporal projection technique of said measurements;
said spatio-temporal interpolation technique of said predictive data based on pre-established bulletins;
said combination technique.

According to yet another feature of the invention, the combination method comprises a step for weighting the techniques of:
temporal projection of said measurements;
spatio-temporal interpolation of said predictive data based on pre-established bulletins;
combination,
obtained by the comparison of each of said techniques for a point in said zone at a past instant t with measurements made at said point at said instant t.

Other features of the invention will become clearer upon reading the following description of three embodiments of the invention, provided as illustrative but non restrictive examples, and the appended drawings.

As previously mentioned, the principle of the invention lies in the fact that it proposes a method for simulating the positioning of at least one towed streamer, which includes a step for predicting the current carried out so as to determine the current fluctuating at several points, this current being the subject of a spatial projection step so as to define the future currents along the length of the streamers. When these future currents are determined, and the hydrodynamic parameters of the streamers and the tail buoys and the future positions of the ship are known, the future form of the streamers is determined by digital resolution of a hydrodynamic model.

Figure 2:
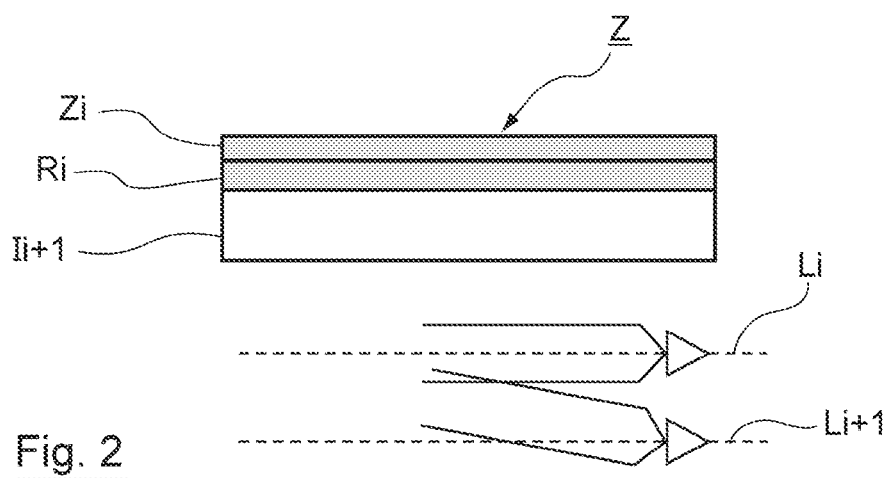
Figure 3:
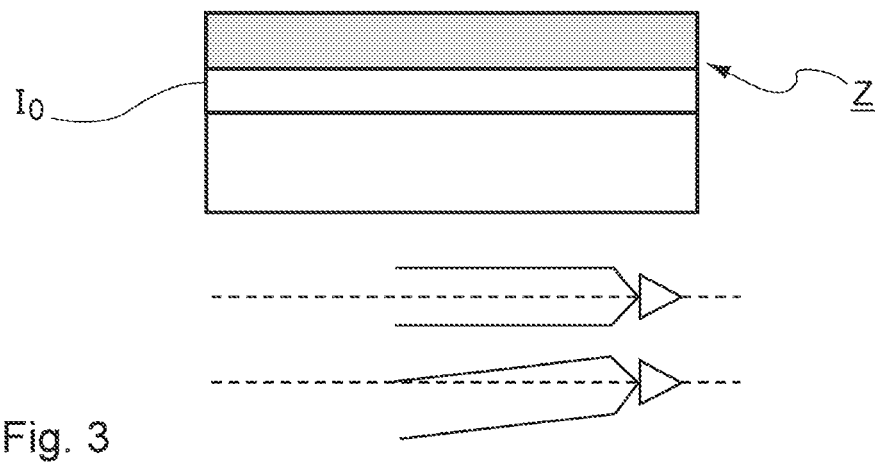

In reference to FIGS. 1 to 3, a ship 1 towing two streamers S1 and S2 and moving in the direction of an arrow F along a trajectory Li is shown.

It may be noted that the streamers S1 and S2 may correspond to the two streamers located at the lateral ends of a network of a plurality of streamers.

During an acquisition campaign, the ship follows a set of lines that ideally are parallel to one another, the distance between two adjacent lines Li and Li+1 as shown in FIG. 1 are chosen so as to obtain a desired coverage continuity of the measurements of the streamer S2 when the ship passes on the line Li with the measurement of the streamer S1 during the following pass of the same ship on the line Li+1.

Thus, when the ship passes along the line Li, the streamers have covered an elementary zone Zi, and when the ship passes along the line Li+1, the streamers have covered an elementary zone Zi+1. The two elementary zones Zi and Zi+1 are continuous. This desired continuity of the coverages is shown in the upper part of FIG. 1.

In FIG. 2, it may be seen that, in the subsequent pass of the ship on the line Li+1, the part of the streamers that is furthest from the ship is offset transversally towards the line Li. This is typically due to the presence of a current in the direction that is transversal to the lines Li and Li+1 when the ship passes on the line Li+1.

A consequence of this situation is that the zone Zi+1 is only partially covered, (which corresponds to a "sub-coverage" situation), and that the zone Zi is partially covered a second time (which corresponds to a "over-coverage" situation).

FIG. 3 illustrates the case where a variation in current between two consecutive passes causes a divergence in the zones covered by the sets of streamers during these two passes.

Furthermore, during an acquisition campaign, the movement of the ships towing the streamers in complete safety, in the midst of obstacles such as petrol barges, is an obligation that must be respected.

Figure 9:
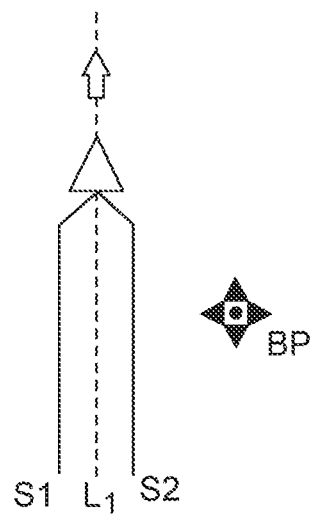
FIGS. 9 and 10 are diagrammatical representations of a ship towing streamers close to a barge, respectively in the absence and in the presence of a transversal current.

FIG. 9 shows the safe passage of said ship towing the two streamers S1 and S2 next to a petrol barge (BP), in the absence of a strong transversal marine current.

Figure 10:
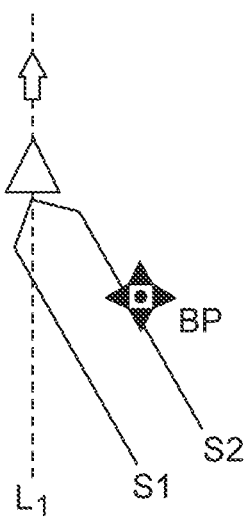

FIG. 10 shows that when this same ship is subjected to a strong transversal current that is poorly or not anticipated, the streamers collide with the barge (BP).

Consequently, the ignorance or failure to take into account marine currents for the positioning of the streamers may cause accidents and major delays in acquisition campaigns.

As previously mentioned, means for improving the safety and means for reducing the additional passes of the ship to fill in the uncovered zones consist in determining the future form of the streamers in function of the effects of the current(s) that are exerted on them.

The method according to the invention which permits to achieve this purpose is described below. The diagram of FIG. 12 shows the main steps of said method.

In the method described below, the form of the streamers (step P1 of FIG. 12) is determined from the digital resolution of the equation of the movements governing an extendable flexible cable subjected to a current which varies along its length. This equation, known to a person skilled in the art, takes into account the different hydrodynamic parameters of the streamers (coefficient of drag, elasticity, torsion, etc.), as well as those of the tail buoys, the relative speed of the water which varies along the length of the streamers and in time, the air speed on the buoys, etc.

In geographical zones with high spatial subsurface current variations, taking the relative speed of the water into account along the length of the streamers is essential for the simulation of the form of the streamers to reflect the actual situation as close as possible.

Figure 12:
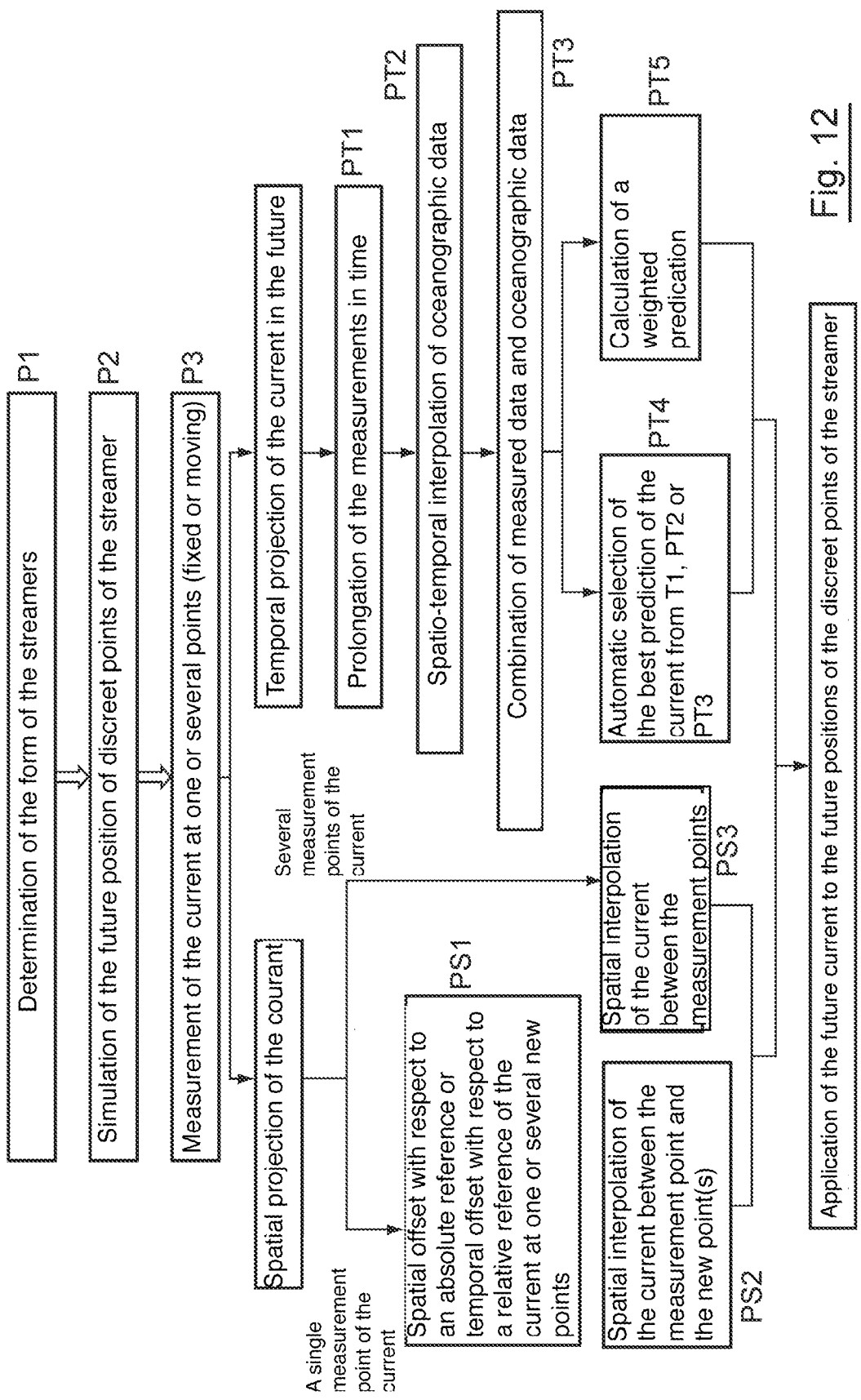
FIG. 12 is a diagram representing the main steps of said method.

To resolve this equation, the positions of the head of the streamer in time must be known (step P2 of FIG. 12).

The method according to the invention permits other known positions along the length of the streamers to be integrated. This aspect permits the result to be improved not just when a streamer is free laterally (i.e. a streamer that is only equipped with depth navigation control devices), but also in the case of a streamer that is guided laterally (they are equipped with depth and lateral navigation control devices, such as those described in the patent document published under the number FR-2 870 509). In the case of guided streamers, the known positions preferably include at least the position of the navigation control devices.

Figure 4:
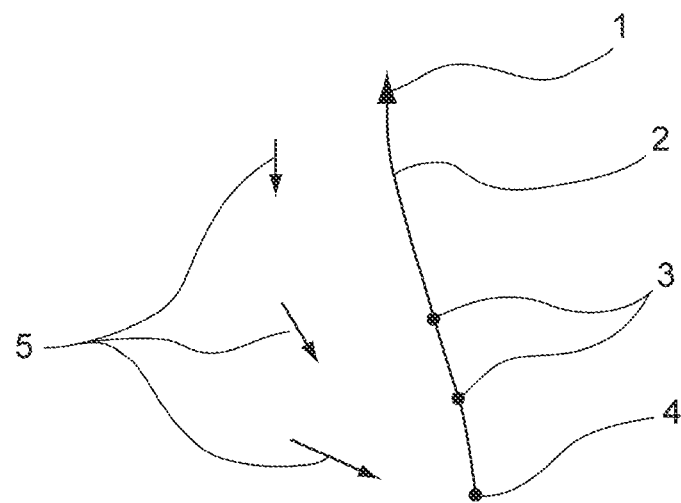
FIG. 4 is a diagrammatical representation of a ship towing a streamer in a study zone with spatial current variations.

FIG. 4 provides a diagrammatical illustration of a ship 1 towing a streamer 2 (associated in this case to the tail of a buoy 4) with two points 3 for which the relative speed of the water is to be predicted. This figure clearly illustrates the case of a current 5 with spatial variations in the study zone, and in particular along the length of the streamer.

To identify the relative speed of the water along the length of the streamers, the current along the length of the streamers must be determined, at the depth of the streamers. The method for determining this current is described below.

To determine the current along the length of the streamers, data on the currents at the depth of the streamers are required. For this, the method according to the invention comprises an upstream phase for using current meter data available for the study zone, these data may be obtained by measurements using one or several current meters, and/or taken from pre-established bulletins (such as oceanographic predictions provided by specialised organisations). These available data are then projected into the future, at different points along the length of the streamers. This temporal projection phase of the current at a point (fixed or moving) will be detailed below in the description.

Figures 5, 6, 7:
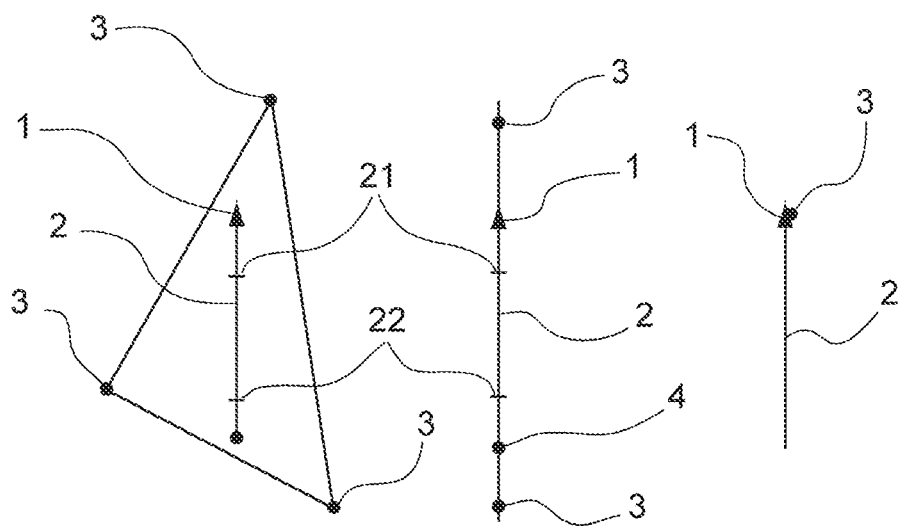
FIGS. 5 to 7 are each a diagrammatical representations of the application of a specific embodiment of a method according to the invention.

Three distinct embodiments are described in reference to FIGS. 5 to 7. In reference to these figures, a ship 1 tows a linear acoustic antenna 2 and the current is measured at one or several points 3.

In the configuration illustrated in FIG. 5, a discreet number of points 3 (fixed or moving) is determined, this number is sufficient to define a perimeter containing at least the streamer 2 whose future form is to be defined. For these points, the current and the associated position (step P3 of FIG. 12) are obtained if possible during an upstream phase.

For this purpose, different means may be used, and especially:
   fixed current meters may be used in the study zone, at the positions of the points 3;
   a current meter may be fitted on the ship 1 towing the streamer 2, while two other current meters are fitted on ships in a position behind the ship 1, one on the starboard and the other on the port side.

In this configuration, the current along the length of the streamer at an instant t is obtained by interpolation on two dimensions at the instant t of the currents at the points 3 in a discreet number of points (between the points 3) along the length of the streamer (supposed to be aligned on the route of the ship), according to step PS3 of FIG. 12).

According to the configuration illustrated by FIG. 6, a discreet number of points 3 (fixed or moving) are determined, in this case at least two, one being in front of and the other behind the streamer 2. For these points, again the current and the associated position (step P3 of FIG. 12) are obtained if possible during an upstream phase.

For this purpose, several means may be used and in particular:
   a current meter is positioned at the head 21 of the streamer, and another current meter is positioned at the tail 22 of the streamer;
   a current meter is fitted on the ship 1 and another on a tail buoy 4;
   two ships, each carrying a current meter navigate, one behind and one in front of the ship 1 towing the streamer 2 whose future form is to be determined.

In this configuration, the current along the length of the streamer 2 at an instant t is obtained by interpolation on one dimension at the instant t of the currents at the points 3 in a discreet number of points (between the points 3) along the length of the streamer (supposedly aligned on the route of the ship), according to step PS3 of FIG. 12.

In the configuration illustrated in FIG. 7, the current and its associated position (step P3 of FIG. 12) are identified using a current meter carried by a point close to the streamer. The proximity of the streamer may be especially the ship towing it, another ship, or even a point of the streamer itself. For this configuration, in order to identify the current at least to a second point of the zone, two possibilities may be envisaged:
   the current at the current meter (for example carried by the ship towing the streamer) is considered to be the one acting along the length of the streamers (it is thus supposed that the temporal variation of the current dominates the spatial variation). In this case, the current data are offset spatially (in the absolute reference) by associating it to new positions (steps PS1 and PS2 of FIG. 12);
   the current at the current meter is offset temporally, so that at a geographic point the current is constant (it is thus supposed that the spatial variations of the current dominate the temporal variations). In this case, the current data are offset temporally (in a relative reference such as the reference of the current meter) by associating it to new positions.

This second point may be especially the tail of the streamer (where the streamer is supposed to follow the route).

In this configuration, it is therefore necessary to determine if a spatial or temporal offset of the current known from the current meter is to be carried out. For this purpose, the in-situ positioning data of the streamers are used. For a period of time for which positioning data are available (and constitute reference data from which reference forms of the streamers can be chosen), the form of the streamers is calculated according to two distinct approaches, one according to which the same current is considered along the length of the streamers, and the other according to which a temporal offset of the current at the level of the ship is made. These simulations are then compared to the in-situ positioning data of the streamers (the two approaches are applied at an instant t in order to calculate a new form at an instant t' posterior to the instant t, the forms calculated for the instant t are then compared to the reference form that the streamer has actually undergone at the instant t).

For example, the quadratic error for the curves of the different angles used to model the streamers, the Euclidian standard between the positions of the nodes, the area between the streamers measured and predicted, or other standards known from the prior art may be chosen as the standard.

The appropriate choice for the study zone thus corresponds to the case with the smallest standard. This method allows to choose between taking into account the spatial variations or the temporal variations of the current.

The temporal projection phase of the current at one point (fixed or moving) is detailed below.

At a point 3 (fixed or moving), the upstream phase of the method permits to obtain:
   N series of current meter measurements up to the present instant;
   the positions of the point (at the level at which the current is to be determined in the future) up to the present instant as well as those of the future instants (during a simulation step);
   M oceanographic predictions for the study zone (the oceanographic predictions are the result of mathematic models which integrate all of the physical phenomena governing the ocean (general currents, tides, winds, density of the water, atmospheric pressure, etc.) which are provided by external organisations in the form of data on a 4 D mesh).

From these data, different predictions for a near future (of around a few hours, for example 6 hours, 12 hours, 24 hours) are calculated and in particular:
   N predictions called "prolonged measurement predictions";
   M predictions called "oceanographic predictions";
   N*M predictions called "combined predictions".

The "prolonged measurement" predictions (step PT1 of FIG. 12) are obtained as follows: for each current meter, after collecting or bringing back the data from the depth of the streamers, the series of currentmeter measurements is prolonged.

The prolongation may be made using different extrapolation algorithms using for example a linear predictor with coefficients depending on the correlation between past values $u_k$ ($1 \leq k \leq K$) (as well as for $l > 0$, $u_{k+1} = \sum_{i=1}^{K} f_1(u_1, u_2, \ldots) u_i$) or even using a linear combination of harmonic components defined with the past values $u_k$ ($1 \leq k \leq K$) (as well as for $m, l > 0$, $u_{k+1} = \sum_m f_m(u_1, u_2, \ldots) \sin(a_{1,m}(u_1, u_2, \ldots)))$. The prolongation is carried out for each current component for example the strength and the direction, or even the zone and meridian components.

The "oceanographic predictions" are obtained as follows: for each oceanographic prediction, as the future positions of the point for which the current is to be predicted are known (by simulation), a four dimensional interpolation (3 spatial dimensions and a temporal dimension) is used to determine the predictions for this point (step PT2 of FIG. 12).

The "combined" predictions (step PT3 of FIG. 12) are obtained as follows. A reminder is first made that, in the same way as meteorological predictions, the oceanographic predictions have local variations. By combining these oceanographic predictions with the current meter data collected, a prediction that makes optimal use of all the data may be obtained. For this purpose, the difference between the oceanographic prediction interpolated at the past positions of the point and the current meter data at this point is calculated at a determined point (the difference is evaluated for each current component). These calculated differences are then prolonged and are then subsequently added to the oceanographic predictions interpolated at the future positions of the point.

The method according to the invention thus allows to obtain, for each point for which the current is to be determined, N "prolonged measurement" predictions, M "oceanographic" predictions and N*M "combined" predictions.

The method according to the invention also permits one of these predictions made in steps PT1, PT2, PT3 to be chosen, and if possible the best one (step PT4 of FIG. 12). This choice is made as follows.

In order to define the best prediction among those made, the method consists in defining the situation a few hours earlier.

From this past date, the N+M+N*M predictions are calculated up until the present instant: N+M+N*M predictions of the "near past" are thus made.

As the in-situ data are known up until the present instant (obtained during an upstream phase by current meter measurements), the method thus consists in comparing the different predictions: it is the calculation of a standard of the difference between the in-situ current and the predicted current which will allow this comparison to be made. The i-th prediction $P_i$ ($1 \leq i \leq N+M+N*M$) has the standard $\alpha_i$.

For example, the chosen standard may be the Euclidian 2D standard, the quadratic error for transversal currents, or other standards known from the prior art.

Figure 11:
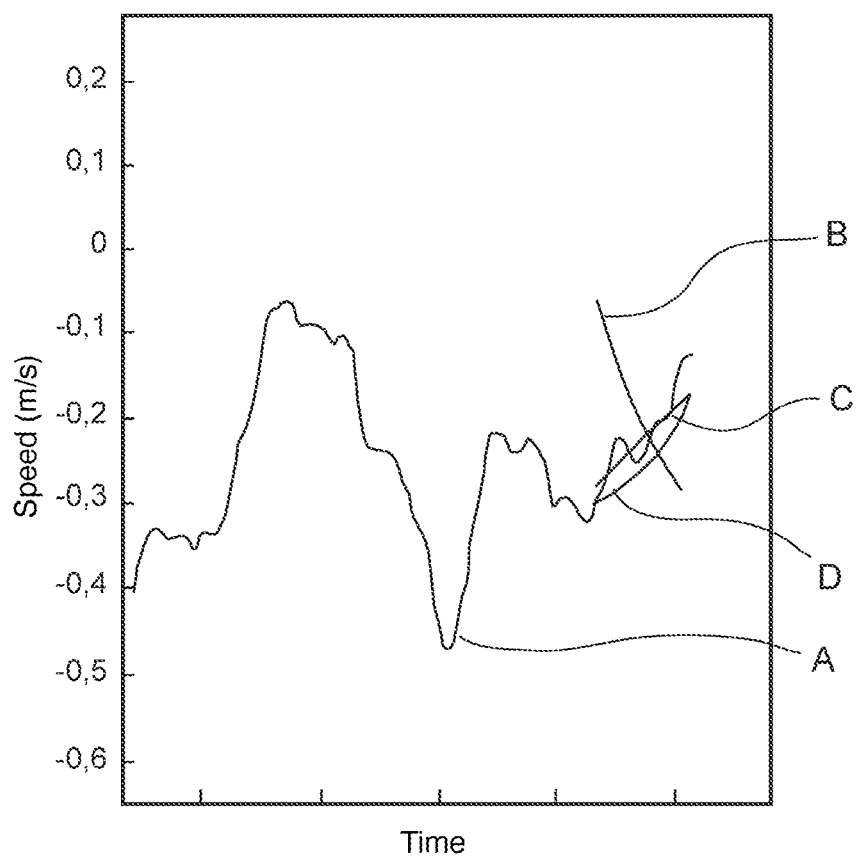
FIG. 11 is a graph of in-situ measurements and projections in time of a current.

FIG. 11 places in parallel different curves among which:
curve A represents the measured current projected up until the present instant;
curve B represents the past "oceanographic" prediction;
curve C represents the past "prolonged measurement" prediction;
curve D represents the past "combined" prediction.

The best "near past" prediction is that which has the smallest standard.

The predictions may then be weighted. For example, the weight $p_i$ is associated to the prediction $P_i$ with $$p_i = \frac{\prod_{\substack{1 \leq j \leq N+M+N*M \\ j \neq i}} \alpha_j}{\sum_{1 \leq k \leq N+M+N*M} \prod_{\substack{1 \leq j \leq N+M+N*M \\ j \neq k}} \alpha_j}.$$

The best "near past" prediction is that which has the largest weighting.

It is therefore supposed that the best prediction for the near future is of the same type as the best "near past" prediction.

A presentation to navigators of this "near past" prediction and the associated weightings offers the navigators an assistance for the decision making concerning the best prediction to adopt. Using objectively calculated weighting permits the navigator to be advised or orientated when making the final choice.

It may be noted that, from the calculated weightings, another prediction may also be made (step PT5 of FIG. 12) which is nothing else but the weighting of the N+M+N*M weighted predictions of the weights corresponding to the N+M+N*M predictions of the "near past". Such a prediction thus obtained ($\sum_{i=1}^{N+M+N*M} p_i P_i$), is called "weighted prediction". This prediction has the advantage of being automatic and is naturally close to the best type of predictions.

In the specific case of the configuration illustrated in FIG. 7 (according to which the only data available on the currents come from a current meter on the ship towing the streamers), the future current on the ship is determined as previously, the method further comprising a step for determining the current along the entire length of the streamer as follows.

For a point along the length of the streamer, there are M ("oceanographic") predictions. It is thus supposed that the difference in the oceanographic predictions is identical for the ship/streamer couple. In this hypothesis, there are also N*M "combined" predictions.

For the N "prolonged measurement" predictions on the ship, two possibilities may be envisaged:
either the N predictions at the ship are used for the prediction at the steamers (it is supposed that the temporal variations of the current dominate the spatial variations);
or a temporal offset is applied to the N predictions, so that at a geographical point, the current is constant (it is supposed that in this case the spatial variations of the current dominate the temporal variations).

The possibility to be applied is determined as previously mentioned by comparing a past measured form of streamer with the simulations made in both cases.

At this point, there are again N+M+N*M predictions $Q_i$, and the choice of the prediction is made in the same way as that chosen for the ship (and if the choice is made to adopt the "weighted" prediction, the same weightings are used as previously, consequently this prediction is $\sum_{i=1}^{N+M+N*M} p_i Q_i$).

Application for the determination of the transversal drift of a point of the streamers From the calculated positioning of the streamers, it is simple, for a specific point of a streamer, to determine its drift with respect to the trajectory of the ship, by calculating the distance of the simulated position of this point with respect to the line defining the trajectory of the ship. For example, it is possible to calculate the transversal drift of the tail of the external port side streamer, the transversal drift of the central streamer a quarter of the way along its length, the point of the external streamer with the largest drift and its associated drift, etc.

Calculating a transversal drift in the future allows the navigator to identify in the future the width of the network of streamers, and to define the route to take to navigate with the most safety.

Application for the choice of the future line to be towed, the time of departure for this line and the mean speed of the ship For each potential future line, the following procedure is adopted:

either the current measured on the adjacent line already towed is compared with that predicted for the future line (comparison by similarity of currents);

or the form of the streamers measured on the adjacent line already towed is compared with that predicted for the future line (comparison by similarity of deformations).

The choice between one or the other of the solutions is made depending on the relative direction of the adjacent and future lines:

if they are in the same direction, a comparison of the currents is sufficient and will be made automatically (a comparison of the forms may however be carried out); this choice has the advantage of not taking into account the hydrodynamic parameters of the streamers and, consequently, poor knowledge of them does not affect the calculation of the deformations and the final result;

if they are in the opposite direction, a comparison of the forms is required (due to the inertia of the streamers which is inverted on the two lines) and will be made automatically. It should be noted that if several lines are compared, if one of them is opposite to its adjacent line that is already towed, then the similarity of the deformations is chosen automatically.

For each potential future line, for each possible departure time (on a defined time pitch) or for each possible speed of the ship (on a defined pitch), the current or the form of the future line is predicted and then compared by calculating a standard of the difference between the prediction made and the measurements made for the adjacent line.

Figure 8:
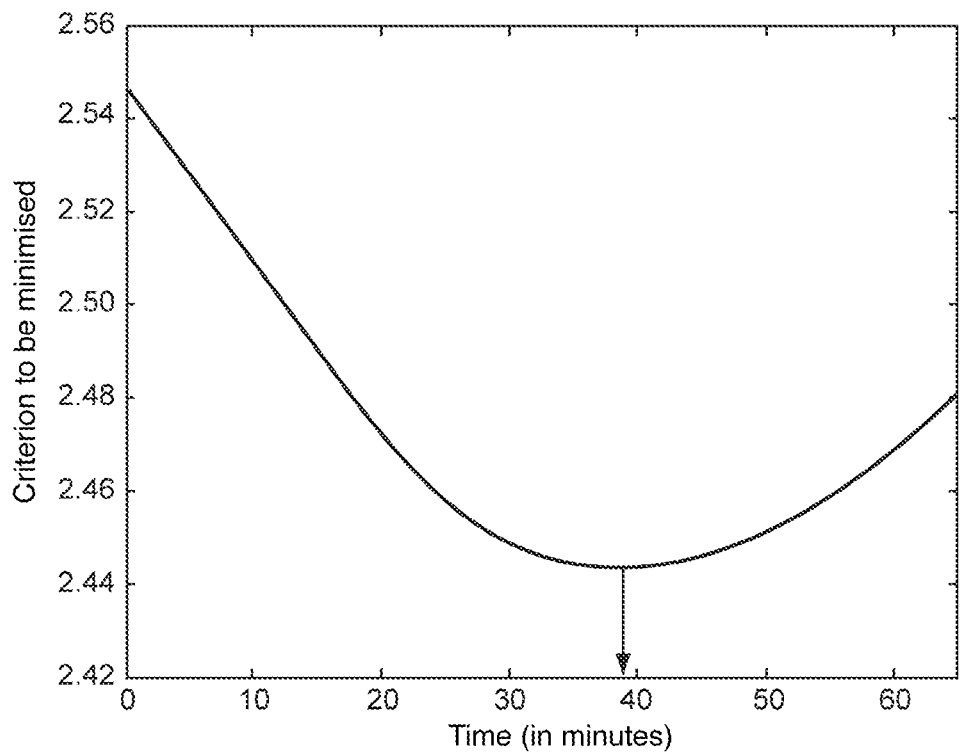
FIG. 8 illustrates a decision-making graph for navigating a ship, for the departure of the ship in a study zone in function of the current.

The optimum choice is thus that for which the line, the time and the speed correspond to the smallest standard. These different parameters may be presented to the navigator on a graph such as that illustrated in FIG. 8. Carrying out such an operation thus permits the navigator to choose the scenario which reduces as far as possible the "holes in the coverage" between different possible scenarios in the near future.

The invention claimed is:

1. A method for simulating, by a computer, the positioning of at least one acoustic linear antenna towed in a study zone, wherein the method comprises the following steps:

(A) towing at least one acoustic linear antenna in the study zone;

(B) predicting temporal and spatial variations of at least one marine current capable of interacting with said at least one acoustic linear antenna, the step of predicting comprising:

an upstream phase of determining a plurality of points defining a space in the study zone in which said at least one acoustic linear antenna is likely to be contained, each point being associated with a current;

a simulation phase, for each determined point, of at least one future position of said determined point;

a temporal projection phase, for each simulated future position, of the current associated with the point for which said future position is simulated;

a spatial projection phase of the temporal projected currents, on at least two distinct points of said at least one acoustic linear antenna; and (C) determining the form of said at least one acoustic linear antenna by resolution of a hydrodynamic model by means of the spatial projected currents.

2. The method for simulating the positioning of at least one acoustic linear antenna according to claim 1, characterized in that said upstream phase is carried out by successive measurements of said current in a discreet number of at least one determined point of said study zone and that said successive measurements are carried out at at least two points of a trajectory of said acoustic linear antennae, at least one point being in front of said antenna(e) and at least one point being behind said antenna(e) with respect to said trajectory, said spatial projection phase comprising at least one one-dimensional interpolation.

3. The method for simulating the positioning of at least one acoustic linear antenna according to claim 1, wherein the currents associated with the determined points of the study zone are determined from current meter measurements, said spatial projection phase comprising at least one two-dimensional interpolation step of said current meter measurements along said at least one acoustic linear antenna.

4. The method for simulating the positioning of at least one acoustic linear antenna according to claim 1, characterized in that said upstream phase is carried out by successive measurements of said current in a discreet number of at least one determined point of said study zone and that said successive measurements are carried out at a single moving point, said measurements at said moving point being projected on at least one second point of said zone.

5. The method for simulating the positioning of at least one acoustic linear antenna according to claim 4, characterised in that it comprises either a temporal offset step with respect to a relative reference or a spatial offset step with respect to an absolute reference of said measurements at said moving point.

6. The method for simulating the positioning of at least one acoustic linear antenna according to claim 4, characterised in that it comprises a selection step, for said projection at said second point, between said spatial offset step and said temporal offset step, by comparing the reference forms, corresponding to actual forms that said acoustic linear antenna(e) have adopted, with simulated forms obtained by applying said spatial offset step and said temporal offset step.

7. The method for simulating the positioning of at least one acoustic linear antenna according to claim 1, wherein the currents associated with the determined points of the study zone are determined from current meter measurements, and wherein said temporal projection phase uses at least one temporal projection technique of said current meter measurements and/or at least one spatio-temporal interpolation technique of predictive data based on pre-established bulletins.

8. The method for simulating the positioning of at least one acoustic linear antenna according to claim 6, characterised in that said temporal projection phase uses at least one combination technique of said temporal projection technique with said spatio-temporal interpolation technique.

9. The method for simulating the positioning of at least one acoustic linear antenna according to claim 8, characterised in that said combination technique comprises a step for determining differences by comparing the results of said spatio-temporal interpolation step for the past with the currents measured during said upstream phase, wherein said differences are designed to be projected in time and to be added to the results of said spatio-temporal interpolation step for the future.

10. The method for simulating the positioning of at least one acoustic linear antenna according to claim 7, wherein said temporal projection phase comprises a step for choosing between a technique or a combination of at least two techniques among the group of:
   said temporal projection technique of said current meter measurements; and
   said spatio-temporal interpolation technique for said predictive data based on pre-established bulletins.

11. The method for simulating the positioning of at least one acoustic linear antenna according to claim 7, wherein said temporal projection phase comprises a step for weighting the techniques of:
   temporal projection of said current meter measurements; and
   spatio-temporal interpolation of said predictive data based on pre-established bulletins, obtained by comparing each of said techniques for a point in said zone at a past instant t with measurements made at said point at said instant t.

\* \* \* \* \*